United States Patent
Jo et al.

(10) Patent No.: US 7,408,879 B2
(45) Date of Patent: Aug. 5, 2008

(54) ROUTER, TERMINAL APPARATUS, COMMUNICATION SYSTEM AND ROUTING METHOD

(75) Inventors: Manhee Jo, Yokohama (JP); Yasuhisa Hayashi, Yokohama (JP); Takatoshi Okagawa, Yokosuka (JP); Takeshi Ihara, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1031 days.

(21) Appl. No.: 10/316,056

(22) Filed: Dec. 11, 2002

(65) Prior Publication Data

US 2003/0112753 A1 Jun. 19, 2003

(30) Foreign Application Priority Data

Dec. 13, 2001 (JP) .............................. 2001-380677

(51) Int. Cl.
  *H04J 1/16* (2006.01)
  *H04L 12/28* (2006.01)
  *G06F 15/16* (2006.01)

(52) U.S. Cl. ....................... 370/235; 370/252; 370/392; 370/401; 709/232

(58) Field of Classification Search ......... 370/229–230, 370/235, 252, 253, 389, 392, 503, 468, 401, 370/465, 474; 709/232
See application file for complete search history.

(56) References Cited

U.S. PATENT DOCUMENTS

| 4,569,042 A | 2/1986 | Larson |
| 4,894,823 A * | 1/1990 | Adelmann et al. .......... 370/252 |
| 5,566,163 A | 10/1996 | Petit |
| 5,623,483 A * | 4/1997 | Agrawal et al. ............. 370/253 |
| 6,272,131 B1 | 8/2001 | Ofek |
| 6,845,100 B1 * | 1/2005 | Rinne ..................... 370/395.43 |
| 7,051,106 B2 * | 5/2006 | Grobler et al. .............. 709/228 |
| 7,061,936 B2 * | 6/2006 | Yoshimura et al. .......... 370/474 |
| 2002/0124091 A1 * | 9/2002 | Kurose et al. ............... 709/228 |

FOREIGN PATENT DOCUMENTS

| EP | 1 052 809 | 11/2000 |
| JP | 54-153503 | 12/1979 |
| JP | 59-190757 | 10/1984 |
| JP | 2-2757 | 1/1990 |
| JP | 2000-354604 | 12/2000 |
| WO | WO 99/65197 | 12/1999 |
| WO | WO 00/65783 | 11/2000 |
| WO | WO 00/69127 | 11/2000 |

OTHER PUBLICATIONS

C. Partridge, "Using the Flow Label Field in IPv6", BBN Systems and Technologies, Jun. 1995, pp. 1-6.
A. Conta, "A Proposal for the 1Pv6 Flows", (Internet-Draft), Transwitch Corporation, Nov. 2000, pp. 1-4.

* cited by examiner

*Primary Examiner*—Huy D. Vu
*Assistant Examiner*—Nittaya Juntima
(74) *Attorney, Agent, or Firm*—Oblon, Spivak, McClelland, Maier & Neustadt, P.C.

(57) ABSTRACT

A router includes a clock configured to be synchronous to a transmission terminal that transmits a data packet; a comparator configured to compare a delay time of the data packet with an acceptable delay time of the data packet based on the time obtained from the clock; and a packet processing unit configured to either transfer or discard the data packet based on the comparison result of the comparator.

12 Claims, 8 Drawing Sheets

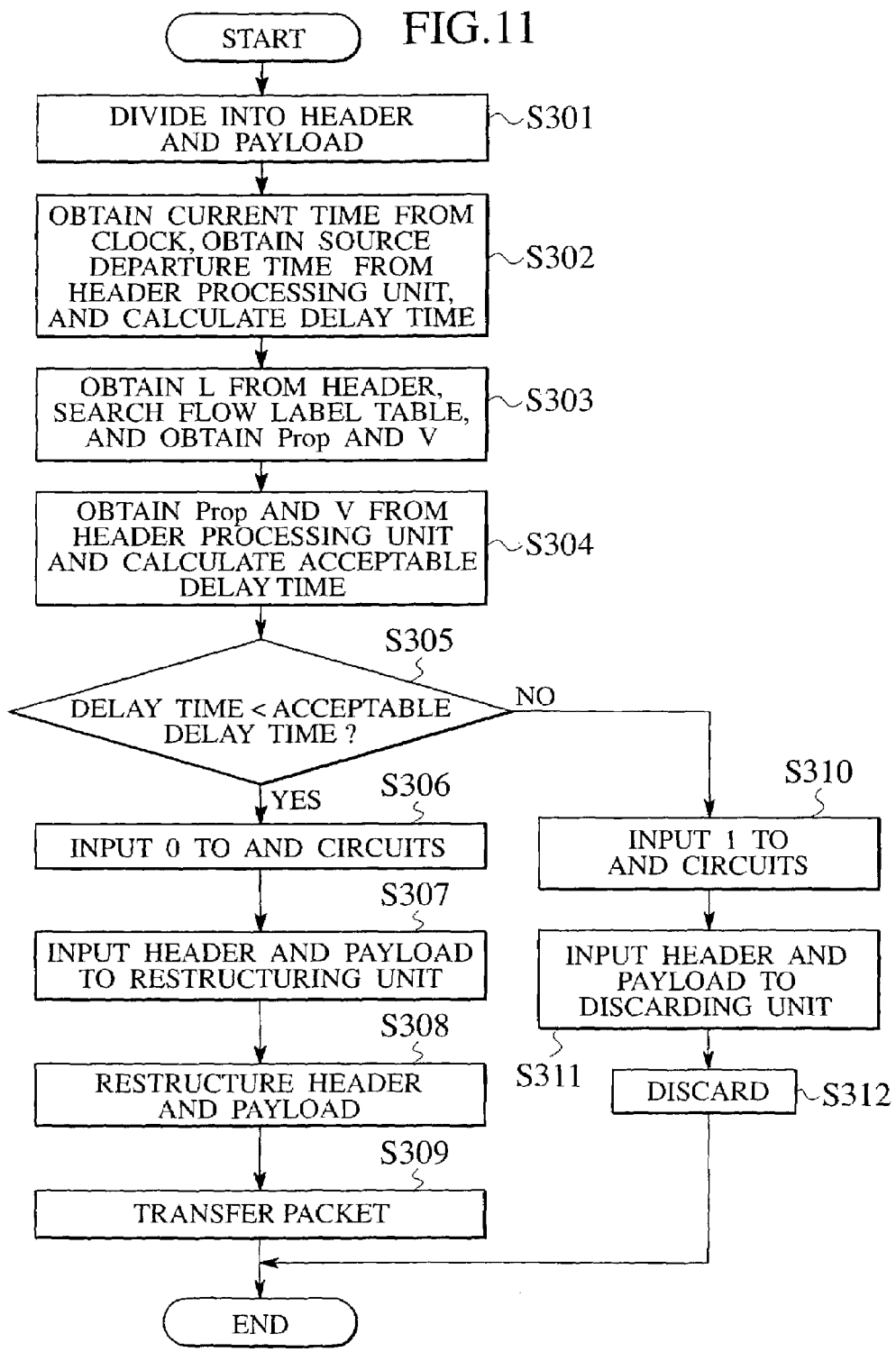

ROUTER, TERMINAL APPARATUS, COMMUNICATION SYSTEM AND ROUTING METHOD

CROSS REFERENCE TO RELATED APPLICATIONS

This application is based upon and claims the benefit of priority from the prior Japanese Patent Applications No. P2001-380677, filed on Dec. 13, 2001; the entire contents of which are incorporated herein by reference.

BACKGROUND OF THE INVENTION

1. Field of the Invention

The present invention relates to a router, a terminal apparatus, a communication system, and a routing method.

2. Description of the Related Art

Conventionally, a router 202 shown in FIG. 1 is used as a router that performs transferring of a real time data packet transmitted from a transmission terminal. To begin with, the transmission terminal transmits a route setup packet necessary for setting up a route to transfer the data packet. A divider 221 receives the route setup packet and inputs it to a header processing unit 222. The header processing unit 222 records in a flow label table 223 source address of the transmission terminal, a flow label and a port address of the next router based on the information included in the route setup packet. Thereafter, the header processing unit 222 inputs the route setup packet to a routing unit 225. The routing unit 225 transfers the route setup packet to the next downstream router. In this manner, the router 202 sets up the route for transferring the data packet.

Next, the transmission terminal transmits the data packet. The divider 221 receives the data packet, and divides it into a header and a payload. The divider 221 inputs the header to the header processing unit 222. The header processing unit 222 obtains the flow label from the header. Using the obtained flow label, the header processing unit 222 then searches the flow label table 223 and obtains the address for the transfer destination router of the data packet.

Furthermore, the divider 221 inputs the divided header and payload into a restructuring unit 224. The restructuring unit 224 creates a data packet by restructuring the inputted header and payload, and inputs it to the routing unit 225. The header processing unit 222 controls the routing unit 225 so as to transfer the data packet to the address of the obtained transfer destination router. The routing unit 225 transfers to the next router the data packet, which has been obtained from the restructuring unit 224, under the control of the header processing unit 222.

With this type of router 202, the flow label is recorded in the router 202. Accordingly, there is an advantage of allowing the router 202 to achieve speedy routing of the data packet along a set route by using the flow label.

However, with the conventional router 202, a data packet to be transferred along the set route is transferred in all cases. Accordingly, the router 202 along the set route even transfers to the reception terminal a data packet that has arrived late at the router 202 with a delay time that has exceeded the acceptable delay time of the application. In other words, even in a case where a delay in the transfer of the data packet in the network occurs, and the data packet no longer satisfies the application quality since it has not been able to reach the reception terminal within the acceptable delay time, the router 202 will still transfer that data packet to the reception terminal.

If the reception terminal receives that kind of data packet, it will simply discard the data packet since it cannot be normally recreated as an application. In this manner, there are cases where the conventional router 202 transfers to the reception terminal a data packet that is useless thereto. In other words, there are cases where the conventional router 202 carries out unnecessary transfer processing. Furthermore, there are cases where network resources along the route are wasted due to the router 202 performing such unnecessary transfer processing.

BRIEF SUMMARY OF THE INVENTION

An object of the present invention is to effectively utilize network resources by eliminating the transfer processing of a data packet with a large delay time and which is unnecessary for the reception terminal.

According to an aspect of the present invention, a router includes a clock configured to be synchronous to a transmission terminal that transmits a data packet; a comparator configured to compare a delay time of the data packet with an acceptable delay time of the data packet based on the time obtained from the clock; and a packet processing unit configured to either transfer or discard the data packet based on the comparison result of the comparator.

With this type of router, the comparator obtains the time from the clock that is synchronous to the transmission terminal that transmits a data packet. Therefore, the comparator can grasp the delay time of the data packet transmitted from the transmission terminal based on that time. The comparator then compares the delay time of the data packet with the acceptable delay time of the data packet. The packet processing unit either transfers or discards the data packet based on the comparison result of the comparator.

Accordingly, the router may transfer a data packet necessary for the reception terminal and discard an unnecessary data packet based on the result of comparing the delay time of the data packet and acceptable delay time of the data packet. As a result, the router can effectively utilize network resources by eliminating the transfer processing of a data packet with a large delay time and which is unnecessary for the reception terminal.

BRIEF DESCRIPTION OF THE SEVERAL VIEWS OF THE DRAWINGS

FIG. 11 is a flowchart showing a procedure of router processing when transferring a data packet according to the embodiment of the present invention.

DETAILED DESCRIPTION OF THE INVENTION

An embodiment of the present invention will be described with reference to the accompanying drawings.

Communication System

Figure 1:
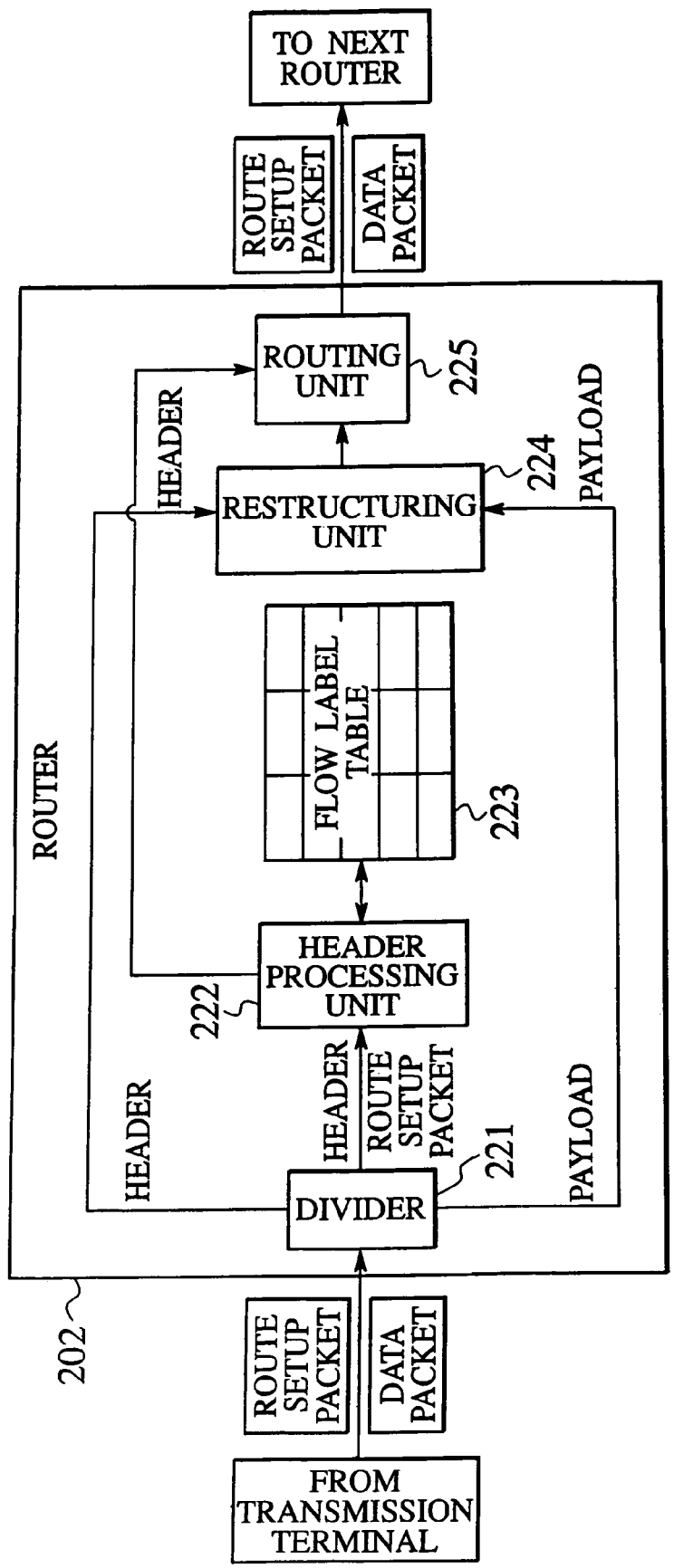
FIG. 1 is a block diagram illustrating the configuration of a conventional router.
Figure 2:
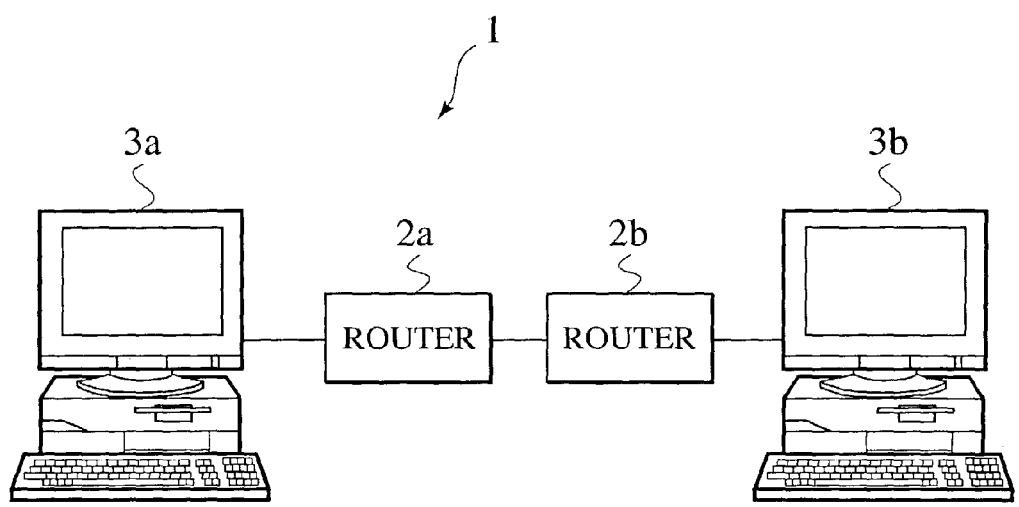
FIG. 2 is a diagram illustrating the configuration of a communication system according to an embodiment of the present invention.

As shown in FIG. 2, a communication system 1 includes a plurality of routers 2a and 2b, a transmission terminal 3a, and a reception terminal 3b. When the transmission terminal 3a transmits a packet, the routers 2a and 2b transfers the packet so as to deliver it to the reception terminal 3b. The reception terminal 3b then receives the packet.

(Router)

Figure 3:
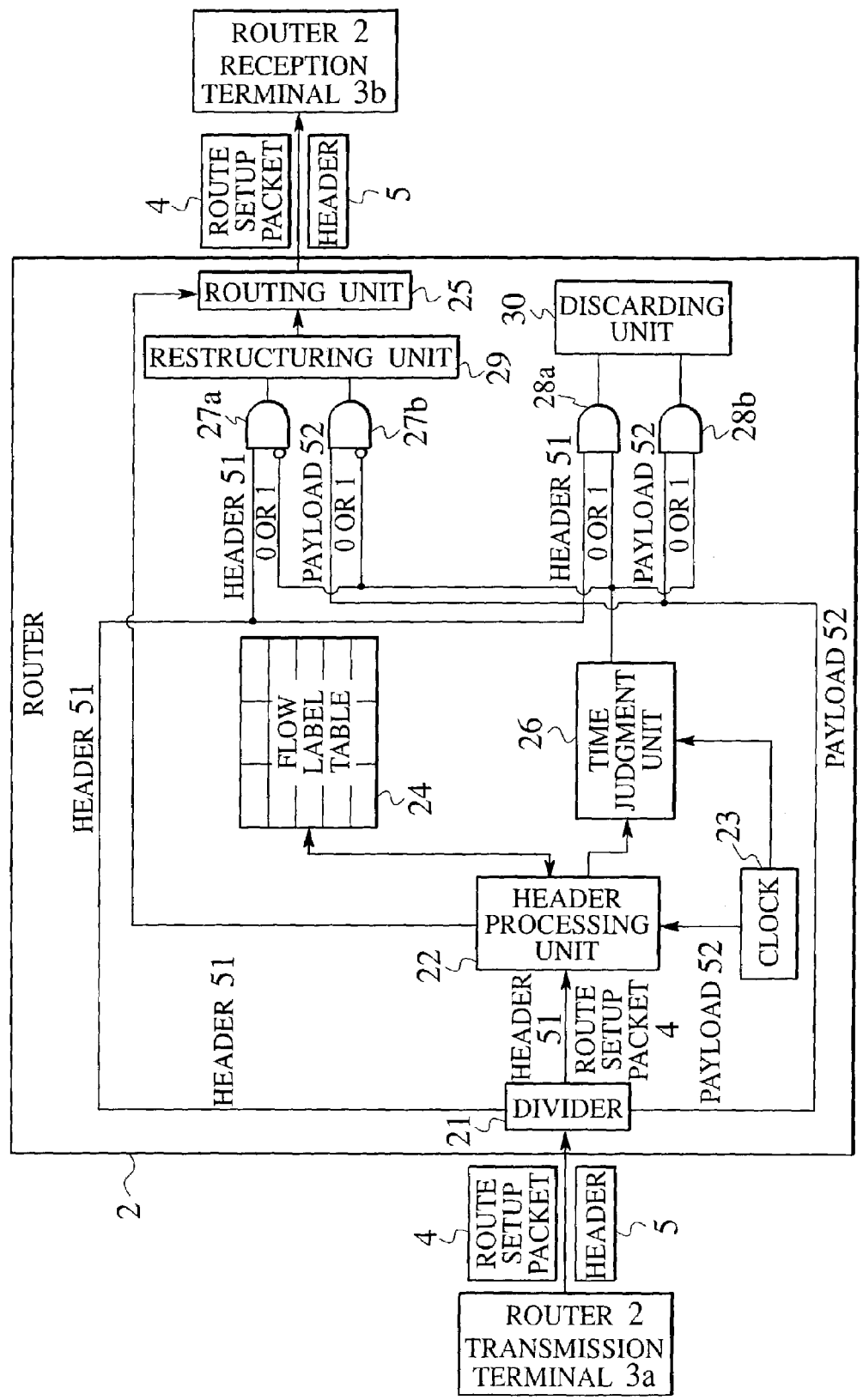
FIG. 3 is a block diagram illustrating the configuration of a router according to the embodiment of the present invention.

As shown in FIG. 3, a router 2 includes a divider 21, a header processing unit 22, a clock 23, a flow label table 24, a routing unit 25, a time judgment unit 26, AND circuits 27a, 27b, 28a, and 28b, a restructuring unit 29, and a discarding unit 30. The router 2 functions as routers 2a and 2b shown in FIG. 2.

The divider 21 receives a packet transmitted from the transmission terminal 3a or another router 2. The packet is either a data packet that includes user data in the transmission terminal 3a or a route setup packet used when setting up a route to transfer the data packet.

Figure 4:
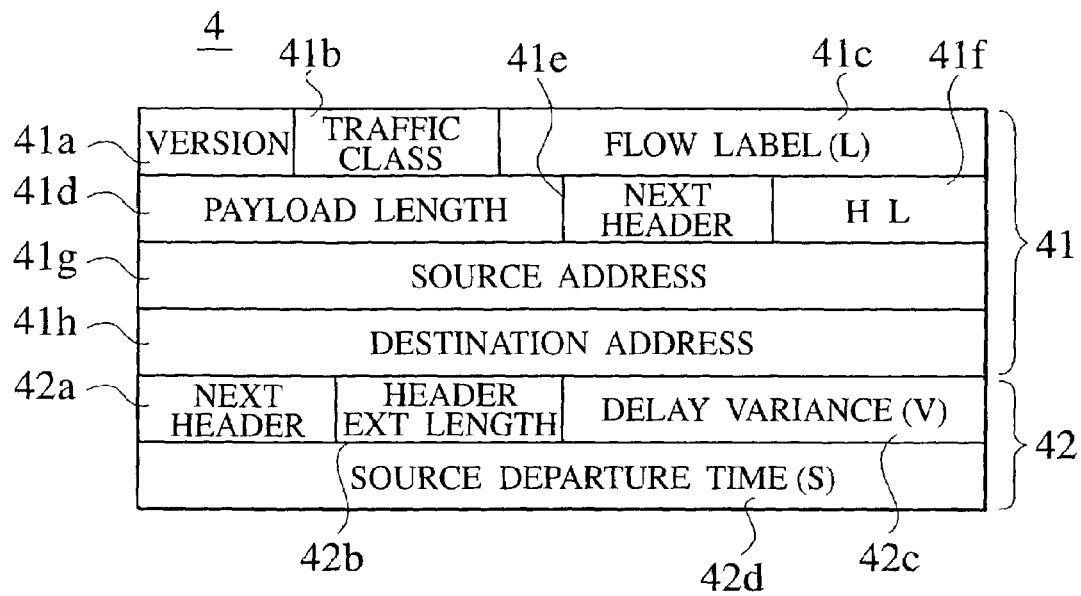
FIG. 4 is a diagram illustrating a route setup packet according to the embodiment of the present invention.

As shown in FIG. 4, the route setup packet 4 includes an IPv6 header 41 and an option header 42. Since the purpose of the route setup packet 4 is to set up a route, the route setup packet does not have a payload to record user data; however, there is no problem with a route setup packet having a payload.

The IPv6 header 41 is a standard header supplied with an IPv6 packet. The IPv6 header 41 includes a version field 41a, a traffic class field 41b, a flow label field 41c, a payload length field 41d, a next header field 41e, an HL field 41f, a source address field 41g, and a destination address field 41h.

The version field 41a indicates the Internet protocol version, and the version number is recorded. Here, since the version is IPv6, "6" is recorded in the version field 41a. The traffic class field 41b indicates the priority level, and a number determining the transfer priority level of the packet is recorded. A flow label is recorded in the flow label field 41c. A flow label is an identifier for the data flow used to realize routing control on an IP layer. The payload size is recorded in the payload length field 41d. The next header field 41e indicates the type of header subsequent to the IPv6 header 41. Here, "option header" is recorded in the next header field 41e since the option header 42 is the next header. A hop limit for relaying the packet is recorded in the HL field 41f. Therefore, if the hop limit becomes "0", that packet is discarded instead of being relayed. The hop limit serves a similar role as the TTL in IPv4. The IP address of the transmission terminal 3a is recorded in the source address field 41g as the source address. The IP address of the reception terminal 3b is recorded in the destination address field 41h as the destination address.

An option header is one that is used for realizing optional functions according to need. The option header 42 includes a next header field 42a, a header ext length 42b, a delay variance field 42c, and a source departure time field 42d. The next header field 42a indicates the type of header subsequent to the option header 42. If there is another option header following the option header 42, that option header becomes the next header. In the case where there is no other option header following the option header 42, the header of an upper layer, such as TCP or UDP, becomes the next header. The size of the option header 42 is recorded in the header ext length 42b. The delay variance is recorded in the delay variance field 42c.

The delay variance is the difference between an acceptable delay time between the transmission terminal 3a and reception terminal 3b, and a propagation delay time between the transmission terminal 3a and reception terminal 3b. The acceptable delay time between the transmission terminal 3a and reception terminal 3b is the time that accepts for an application on an upper layer of the reception terminal 3b to normally operate as the time required for a data packet 5 to be transferred from the transmission terminal 3a to the reception terminal 3b. The propagation delay time between the transmission terminal 3a and reception terminal 3b is the time required for a packet to be transferred and propagated from the transmission terminal 3a to the reception terminal 3b when the route is normal. A normal route indicates a state in which no failure, congestion or the like has occurred along the route. The time the route packet 4 leaves the transmission terminal 3a is recorded in the source departure time field 42d. In other words, the time that the transmission terminal 3a transmits the route setup packet 4 is recorded in the source departure time field 42d.

Hereinafter, the time a packet leaves the transmission terminal 3a is referred to as the source departure time. Furthermore, information related to the acceptable delay time is referred to as "acceptable delay time information". The acceptable delay time information includes information necessary for finding the acceptable delay time such as the delay variance, propagation delay time, the source departure time which is required for finding the propagation delay time and the like, and the acceptable delay time itself. Accordingly, the route setup packet 4 includes the acceptable delay time information.

Figure 5:
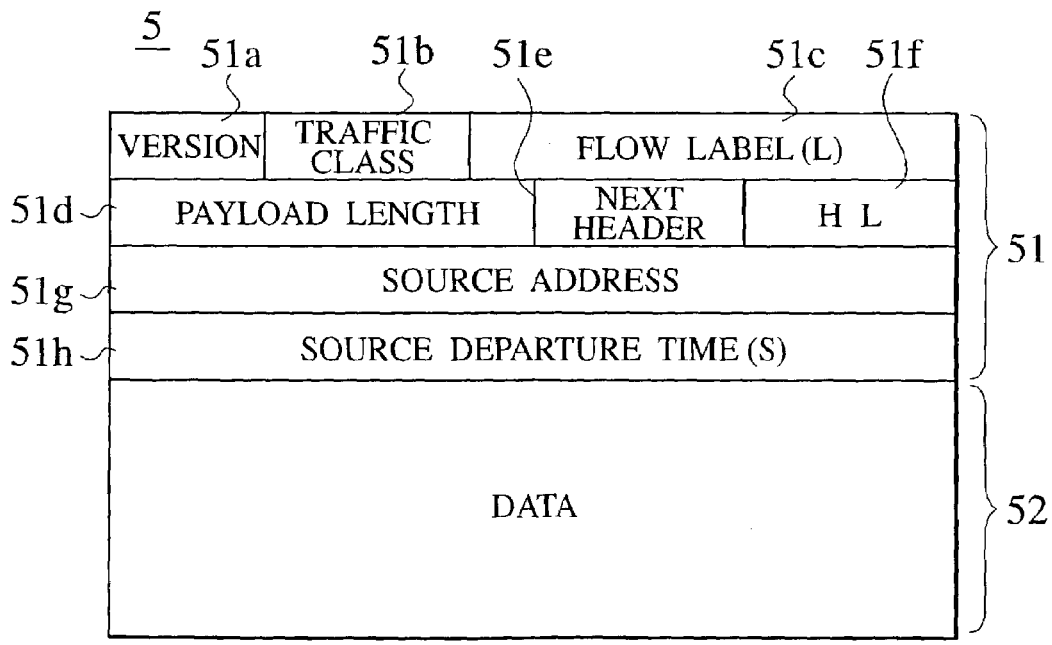
FIG. 5 is a diagram illustrating a data packet according to the embodiment of the present invention.

As shown in FIG. 5, the data packet 5 includes a header 51 and a payload 52. The header 51 is used in controlling the data packet 5. The header 51 includes a version field 51a, a traffic class field 51b, a flow label field 51c, a payload length field 51d, a next header field 51e, an HL field 51f, a source address field 51g, and a source departure time field 51h. The version field 51a, the traffic class field 51b, the flow label field 51c, the payload length field 51d, the next header field 51e, the HL field 51f, and the source address field 51g are similar to the version field 41a, the traffic class field 41b, the flow label field 41c, the payload length field 41d, the next header field 41e, the HL field 41f, and the source address field 41g in the route setup packet 4.

The source departure time of the data packet 5 is recorded in the source departure time field 51h. The time the transmission terminal 3a transmits the data packet 5 and the data packet 5 leaves the transmission terminal 3a is recorded in the source departure time field 51h. This source departure time field 51h is normally a destination address field in which the IP address of the reception terminal 3b is recorded. However, the routers 2a and 2b can transfer the data packet 5 using the flow label recorded in the flow label field 51c. Accordingly, as it is, the destination address field becomes a redundant field that is not used when transferring the data packet 5. Therefore, by recording the source departure time of the data packet 5 in a field that normally records the destination address and using that field as the source departure time field 51*h* allows for that field to be effectively utilized.

It should be noted that a new field as the source departure time field 51*h* may be created other than the destination address field before and added to the header 51. Furthermore, the source departure time may be recorded in another field of the header 51. User data of the transmission terminal 3*a* is recorded in the payload 52.

As shown in FIG. 3, in the case of receiving the route setup packet 4, the divider 21 inputs the route setup packet 4 to the header processing unit 22 since the route setup packet 4 is configured from only a header. In the case of receiving the data packet 5, the divider 21 divides the data packet 5 into the header 51 and payload 52. The divider 21 provides the header 51 to the header processing unit 22. Furthermore, the divider 21 inputs the header 51 to the AND circuits 27*a* and 28*a*, and the payload 52 to the AND circuits 27*b* and 28*b*.

The clock 23 is a clock that is synchronous to the transmission terminal 3*a*, the reception terminal 3*b*, and a plurality of routers 2. In other words, the clock 23 grasps the same time as the transmission terminal 3*a*, the reception terminal 3*b*, and a plurality of routers 2. The clock 23 provides the current time to the header processing unit 22 and the time judgment unit 26.

The flow label table 24 stores routing control information necessary for performing routing control using a flow label. The routing control information includes a source address, a flow label, the address of the router 2 or reception terminal 3*b*, which becomes the next transfer destination of the data packet 5, and the acceptable delay time information. In this embodiment, the flow label table 24 stores as the routing control information a transmission source address, a flow label, the address of the next transfer destination of the data packet 5, and the acceptable delay time information such as the delay variance and the propagation delay time that occurs in each router 2. In this manner, the flow label 24 functions as a memory unit to store the acceptable delay time information. It should be noted that the propagation delay time that occurs in each router 2 is the time required for a packet to be transferred and propagated from the transmission terminal 3*a* to a router 2 when the route is normal. Furthermore, the time accepted for a packet to be transferred from the transmission terminal 3*a* to a router 2 is referred to as the acceptable delay time for each router 2. The acceptable delay time for each router 2 is the sum of the acceptable delay time variance and the propagation delay time that occurs in each router 2.

The header processing unit 22 performs processing regarding a header by obtaining the route setup packet 4 and header 51. When obtaining the route setup packet 4, the header processing unit 22 obtains the source departure time from the route setup packet 4. Furthermore, the header processing unit 22 obtains the current time from the clock 23. The header processing unit 22 then finds the difference between the current time and source departure time to calculate the propagation delay time that occurs the router 2.

Furthermore, the header processing unit 22 obtains a source address, a flow label, and a delay variance from the route setup packet 4 and records them in the flow label table 24 along with the calculated propagation delay time that occurs in the router 2*a*. Furthermore, the header processing unit 22 also records in the flow label table 24 the address of the next router 2 or reception terminal 3*b*, which becomes the transfer destination. The header processing unit 22 then provides the route setup packet 4 to the routing unit 25 and instructs the routing unit 25 to transfer the route setup packet 4 to the next router 2 or reception terminal 3*b*, which are further downstream along the route. In this manner, when the header processing unit 22 obtains the route setup packet 4, it functions as a recording unit to record the acceptable delay time information in the flow label table 24 based on the acceptable delay time information, such as the delay variance and source departure time, which is included in the route setup packet 4.

In this manner, the header processing unit 22 can obtain the source departure time from the route setup packet 4 and the current time from the clock 23, and then calculate the propagation delay time based thereupon. Furthermore, the header processing unit 22 may obtain the delay variance from the route setup packet 4 and record it together with the calculated propagation delay time in the flow label table 24. Thus, the router 2 may grasp the acceptable delay time information and stored it in the flow label table 24 during operation of setting up a route for transferring the data packet 5 by transferring the route setup packet 4. Accordingly, it is not necessary for the routers 2*a* and 2*b* to separately perform a particular operation in order to grasp the acceptable delay time information. As a result, the load of processing performed by the routers 2*a* and 2*b* can be reduced, allowing for the effective usage of network resources.

Furthermore, when the header processing unit 22 obtains the header 51 of the data packet 5, it obtains the source departure time from the source departure time field 51*h* that corresponds to the destination address field, inputting it to the time judgment unit 26. Furthermore, the header processing unit 22 obtains the flow label from the header 51. The header processing unit 22 then searches the flow label table 24 using that flow label so as to obtain the propagation delay time that occurs in the router 2 and the delay variance. The header processing unit 22 inputs the obtained propagation delay time and delay variance to the time judgment unit 26. Furthermore, the header processing unit 22 searches the flow label table 24 using the obtained flow label so as to obtain the address of the router 2 or reception terminal 3*b*, which is the transfer destination of the data packet 5. The header processing unit 22 instructs the routing unit 25 to transfer the data packet 5 to the obtained address of the next router 2 or reception terminal 3*b*, which is the transfer destination.

The time judgment unit 26 is a comparator that compares the delay time of the data packet 5 with the acceptable delay time of the data packet 5 based on the time obtained from the clock 23. The time judgment unit 26 compares the delay time of the data packet 5 that occurs in the router 2 with the acceptable delay time of the data packet 5 for the router 2. Furthermore, the time judgment unit 26 also functions as an acceptable delay time calculating unit that calculates the acceptable delay time of the data packet 5 for the router 2. The time judgment unit 26 calculates the acceptable delay time of the data packet 5 for the router 2 by adding together the delay variance of the data packet 5 and the propagation delay time that occurs in the router 2, which are obtained from the flow label table 24 via the header processing unit 22.

Due to each router 2 having the flow label table 24, each router 2 may store acceptable delay time information such as the delay variance and the propagation delay time that occurs in each router 2. Therefore, the time judgment unit 26 may easily obtain the acceptable delay time information from the flow label table 24 via the header processing unit 22, thus grasping the delay variance, propagation delay and the like.

Furthermore, via the header processing unit 22, the time judgment unit 26 obtains the source departure time from the transmission terminal departure time field 51*h* corresponding to the destination address field in the data packet 5. Furthermore, the time judgment unit 26 obtains the current time from the clock 23. The time judgment unit 26 then calculates the delay time that occurs in the router 2 by finding the difference between the current time and source departure time. In this manner, the time judgment unit 26 also functions as a delay time calculating unit that calculates the delay time of the data packet 5 based on the time obtained from the clock 23 and the source departure time obtained from the data packet 5 via the header processing unit 22.

In this manner, the time judgment unit 26 may obtain the source departure time from the transmission terminal departure time field 51h when finding the delay time that occurs in the router 2. The time judgment unit 26 then calculates the delay time of the data packet 5 based on the source departure time and the current time obtained from the clock 23. Accordingly, the router 2 may easily grasp the delay time of the data packet 5. Furthermore, it is not necessary for the transmission terminal 3a to add to the data packet 5 a redundant header, which includes particular overhead information for cooperation with other layers.

The time judgment unit 26 compares the delay time of the data packet 5 that occurs in the router 2 with the acceptable delay time for the router 2. If the delay time is less than the acceptable delay time, the time judgment unit 26 inputs "0" to the AND circuits 27a, 27b, 28a, and 28b as the comparison result. On the other hand, if the delay time is equal to or greater than the acceptable delay time, the time judgment unit 26 inputs "1" to the AND circuits 27a, 27b, 28a, and 28b as the comparison result.

The AND circuits 27a and 28a receive the input of the header 51 from the divider 21. The AND circuits 27a and 28a receive an input of "0" or "1" from the time judgment unit 26. The AND circuits 27b and 28b receive the input of the payload 52 from the divider 21. The AND circuits 27b and 28b receive an input of "0" or "1" from the time judgment unit 26. It should be noted that even though the AND circuits 27a and 27b receive an input of "0" or "1" from the time judgment unit 26, the "0" is replaced with "1" and the "1" is replaced with "0" and then input to the AND circuits 27a and 27b. If the AND circuit 27a receives an input of "0" from the time judgment unit 26, and that "0" is replaced with "1" and input, the AND circuit 27a inputs the header 51 to the restructuring unit 29 so as to activate the restructuring unit 29. If the AND circuit 27b receives an input of "0" from the time judgment unit 26, and that "0" is replaced with "1" and input, the AND circuit 27b inputs the payload 52 to the restructuring unit 29 so as to activate the restructuring unit 29. No operation is performed if the AND circuits 27a and 27b receive an input of "1" from the time judgment unit 26, and that "1" is replaced with "0" and input.

On the other hand, if the AND circuit 28a receives an input of "1" from the time judgment unit 26, it inputs the header 51 to the discarding unit 30 so as to activate the discarding unit 30. If the AND circuit 28b receives an input of "1" from the time judgment unit 26, it inputs the payload 52 to the discarding unit 30 so as to activate the discarding unit 30. No operation is performed if the AND circuits 28a and 28b receive an input of "0" from the time judgment unit 26.

The restructuring unit 29 receives input of the header 51 from the AND circuit 27a. The restructuring unit 29 receives input of the payload 52 from the AND circuit 27b. The restructuring unit 29 is activated by the AND circuit 27a or 27b. The restructuring unit 29 creates the data packet 5 by restructuring the input header 51 and payload 52, and inputs it to the routing unit 25.

The discarding unit 30 receives input of the header 51 from the AND circuit 28a. The discarding unit 30 receives input of the payload 52 from the AND circuit 28b. The discarding unit 30 is activated by the AND circuit 28a or 28b. The discarding unit 30 discards the input header 51 and payload 52.

The routing unit 25 transfers the route setup packet 4 obtained from the header processing unit 22 to the next router 2 or reception terminal 3b, which are further downstream along the route. Furthermore, in the case where the routing unit 25 obtains the data packet 5 from the restructuring unit 29, it transfers the data packet 5 to the router 2 or reception terminal 3b, which is the transfer destination of that data packet 5. The routing unit 25 transfers the route setup packet 4 and data packet 5 as instructed by the header processing unit 22. It should be noted that as long as the data packet 5 is not provided from the restructuring unit 29, the routing unit 25 does not perform any operation against the data packet 5 even if it should receive an instruction from the header processing unit 22.

In this manner, the AND circuits 28a and 28b and the discarding unit 30 may implement a discarding unit, which discards the data packet 5, if the delay time that occurs in the router 2 is greater than the acceptable delay time based on the comparison result of the time judgment unit 26. Furthermore, the AND circuits 27a and 27b, the restructuring unit 29, and the routing unit 25 may implement a transfer unit, which transfers the data packet 5, if the delay time that occurs in the router 2 is less than the acceptable delay time based on the comparison result of the time judgment unit 26 so that the discarding unit 30 does not discard the data packet 5. Accordingly, the AND circuits 27a, 27b, 28a, and 28b, the restructuring unit 29, the discarding unit 30, and the routing unit 25 may implement a packet processing unit that either transfers or discards the data packet 5 based on the comparison result of the time judgment unit 26.

(Terminal Apparatus)

Figure 6:
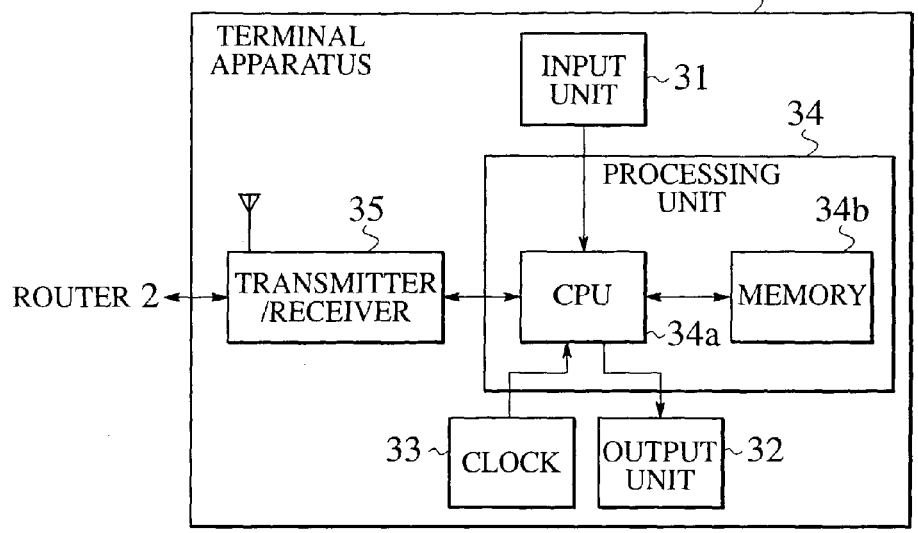
FIG. 6 is a block diagram illustrating the configuration of a terminal apparatus according to the embodiment of the present invention.

As shown in FIG. 6, a terminal apparatus 3 includes an input unit 31, an output unit 32, a clock 33, a processing unit 34, and a transmitter/receiver 35. Furthermore, the processing unit 34 includes a CPU 34a and memory 34b. The terminal apparatus 3 functions as the transmission terminal 3a that transmits a packet or the reception terminal 3b that receives a packet, both which are shown in FIG. 2.

The input unit 31 inputs data to the processing unit 34. The output unit 32 outputs data that has been inputted to the processing unit 34 from the input unit 31 or the transmitter/receiver 35 and then processed by the processing unit 34. The clock 33 is synchronous to another terminal apparatus 3 and a plurality of routers 2. In other words, the clock 33 grasps the same time as another terminal apparatus 3 and a plurality of routers 2. The clock 33 provides the current time to the processing unit 34.

The processing unit 34 creates the route setup packet 4 or data packet 5 that is to be transmitted and transmits it to the router 2 via the transmitter/receiver 35. Furthermore, the processing unit 34 performs packet processing such as recreating as an application the data packet 5 received from the router 2 via the transmitter/receiver 35. Furthermore, the processing unit 34 controls the input unit 31, output unit 32, and transmitter/receiver 35. The memory 34b stores programs that the CPU 34a executes, created packets, received packets, delay variance, and the like. The CPU 34a implements the processing unit 34 by reading out and executing programs stored in the memory 34b.

When setting up a route along which the data packet 5 is transferred, the processing unit 34 records the necessary information in each field of the IPv6 header 41 and option header 42 of the route setup packet 4. At this time, based on the current time obtained from the clock 33, the processing unit 34 records in the source departure time field 42d the source departure time that the transmission terminal 3a transmits the route setup packet 4. Furthermore, the processing unit 34 obtains the delay variance from the memory 34b. The processing unit 34 then records the obtained delay variance in the delay variance field 42c.

Accordingly, before transmission of the data packet 5, the terminal apparatus 3, when setting up a route to transfer the data packet 5, may transmit to the router 2 the route setup packet 4, which includes acceptable delay time information such as the delay variance and the source departure time. This enables the transmission terminal 3a to inform the router 2 along the route of the acceptable delay time information. Accordingly, it is not necessary for the transmission terminal 3a to separately perform a particular operation of informing the router 2 of the acceptable delay time information, and the load of processing is reduced, allowing for the effective usage of network resources.

Furthermore, when transmitting the data packet 5, the processing unit 34 records the necessary information in each field of the header 51 in the data packet 5 and records data in the payload 52. At this time, based on the current time obtained from the clock 33, the processing unit 34 records in the source departure time field 51h that is normally a destination address field the source departure time that the transmitter/receiver 35 transmits the data packet 5. Furthermore, the processing unit 34 records the flow label in the flow label field 51c. This allows the terminal apparatus 3 to inform the router 2 of the flow label necessary for transfer of the data packet 5. Furthermore, recording the source departure time in the actually unused destination address field when transferring the data packet 5 allows the terminal apparatus 3 to effectively utilize that field.

In this manner, the processing unit 34 functions as a control information recording unit that records the acceptable delay time information in the route setup packet 4 and the source departure time in the data packet 5. The processing unit 34 inputs the created route setup packet 4 and data packet 5 to the transmitter/receiver 35.

The transmitter/receiver 35 transmits to the router 2 the route setup packet 4 and data packet 5 input from the processing unit 34 as instructed by the processing unit 34. Furthermore, the transmitter/receiver 35 receives the route setup packet 4 and data packet 5 from the router 2 and provides them to the processing unit 34.

As described thus far, the processing unit 34 obtains the time from the clock 33 that is synchronous to a plurality of routers that transfer the data packet 5, and records the source departure time in the data packet 5. The transmitter/receiver 35 then transmits the data packet 5. This allows the router 2, which receives and transfers that data packet 5, to be informed of the source departure time of the data packet 5. Accordingly, the router 2 can appropriately grasp the delay time of the data packet 5 using that source departure time. As a result, the router 2 can process the data packet 5 based on the delay time.

(Route Setup)

Next, operation of the routers 2a and 2b, the transmission terminal 3a, and the reception terminal 3b when setting up a route to transfer the data packet 5 between the transmission terminal 3a and reception terminal 3b is described. It should be noted that in FIG. 7 through FIG. 11, the source departure time is represented by "S", the delay variance by "V", the flow label by "L", the propagation delay time by "Prop", and the current time by "T". Furthermore, in FIG. 7 and FIG. 8, a partial flow label table 24a is a portion of the flow label table 24 of the router 2a, and a partial flow label table 24b is a portion of the flow label table 24 of the router 2b.

Figure 7:
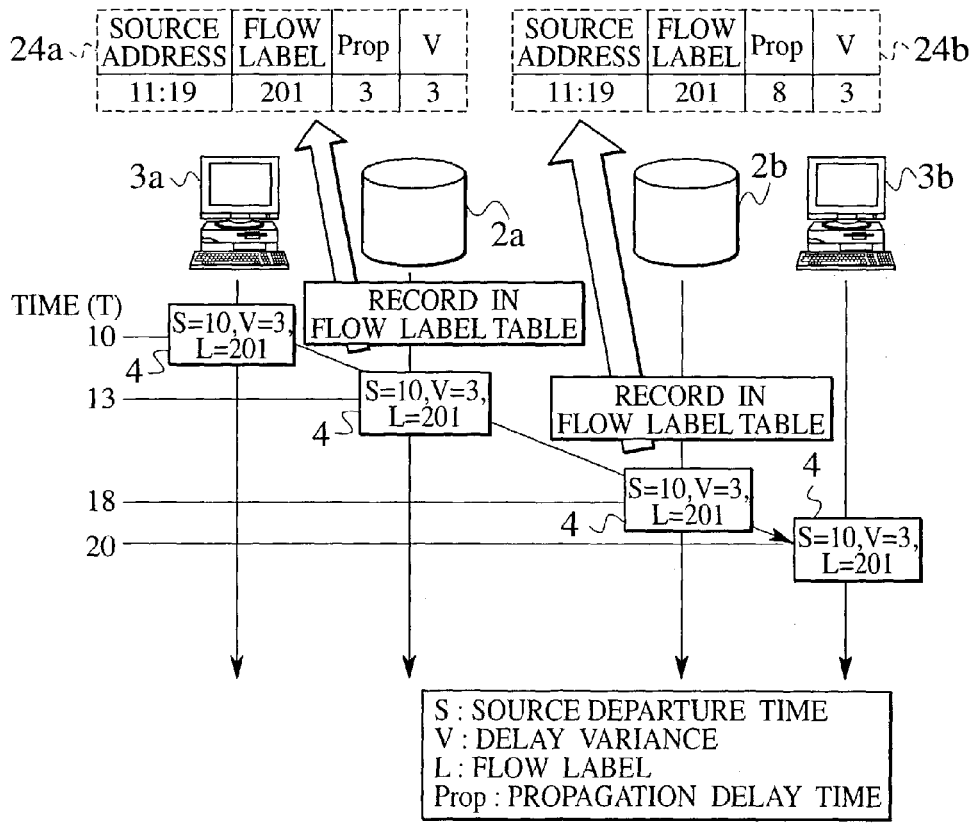
FIG. 7 is a diagram showing operation of a router, a transmission terminal, and a reception terminal when setting up a route according to the embodiment of the present invention.

As shown in FIG. 7, the processing unit 34 of the transmission terminal 3a records in the IPv6 header 41 and option header 42 of the route setup packet 4 information such as a source departure time S=10 based on the current time obtained from the clock 33, an delay variance V=3, a flow label L=201, and a source address "11:19". The transmitter/receiver 35 of the transmission terminal 3a then transmits the route setup packet 4 to the router 2a further downstream along the route than the transmission terminal 3a.

Next, the divider 21 of the router 2a receives the route setup packet 4 and provides it to the header processing unit 22. The header processing unit 22 of the router 2a obtains the source departure time S=10 from the route setup packet 4. Furthermore, the header processing unit 22 of the router 2a obtains a current time T=13 from the clock 23. The header processing unit 22 of the router 2a then finds the difference between the current time T=13 and the source departure time S=10 so as to obtain a propagation delay time Prop=3 from the transmission terminal 3a to the router 2a.

The header processing unit 22 of the router 2a obtains from the route setup packet 4 the source address "11:19", the flow label L=201, and the delay variance V=3, and records them in the flow label table 24 together with the calculated propagation delay time Prop=3 that occurs in the router 2a as shown in the partial flow label table 24a. Furthermore, the header processing unit 22 of the router 2a also records in the flow label table 24 the address of the next router 2b, which is the transfer destination. The header processing unit 22 of the router 2a then provides the route setup packet 4 to the routing unit 25, and instructs the routing unit 25 to transfer the route setup packet 4 to the next router 2b, which is further downstream along the route. The routing unit 25 of the router 2a transfers the route setup packet 4 to the router 2b as instructed by the header processing unit 22.

Next, the divider 21 of the router 2b receives the route setup packet 4 and provides it to the header processing unit 22. The header processing unit 22 of the router 2b obtains the source departure time S=10 from the route setup packet 4, and a current time T=18 from the clock 23. The header processing unit 22 of the router 2b then finds the difference between the current time T=18 and the source departure time S=10 so as to obtain a propagation delay time Prop=8 from the transmission terminal 3a to the router 2b. The header processing unit 22 of the router 2b obtains from the route setup packet 4 the source address "11:19", the flow label L=201, and the delay variance V=3, and records them in the flow label table 24 together with the calculated propagation delay time Prop=8 that occurs in the router 2b as shown in the partial flow label table 24b. Furthermore, the header processing unit 22 of the router 2b also records in the flow label table 24 the address of the reception terminal 3b, which is the transfer destination.

The header processing unit 22 of the router 2b then provides the route setup packet 4 to the routing unit 25, and instructs the routing unit 25 to transfer the route setup packet 4 to the reception terminal 3b, which is further downstream along the route. The routing unit 25 of the router 2b transfers the route setup packet 4 to the reception terminal 3b as instructed by the header processing unit 22, whereby route setup is complete. Finally, the transmitter/receiver 35 of the reception terminal 3b receives the route setup packet 4, however the reception terminal 3b does not particularly perform any operation. With such operations, each of the routers 2a and 2b may store routing control information in the flow label table 24 and may set up a route to transfer the data packet 5.

(Data Packet Transfer)

Figure 8:
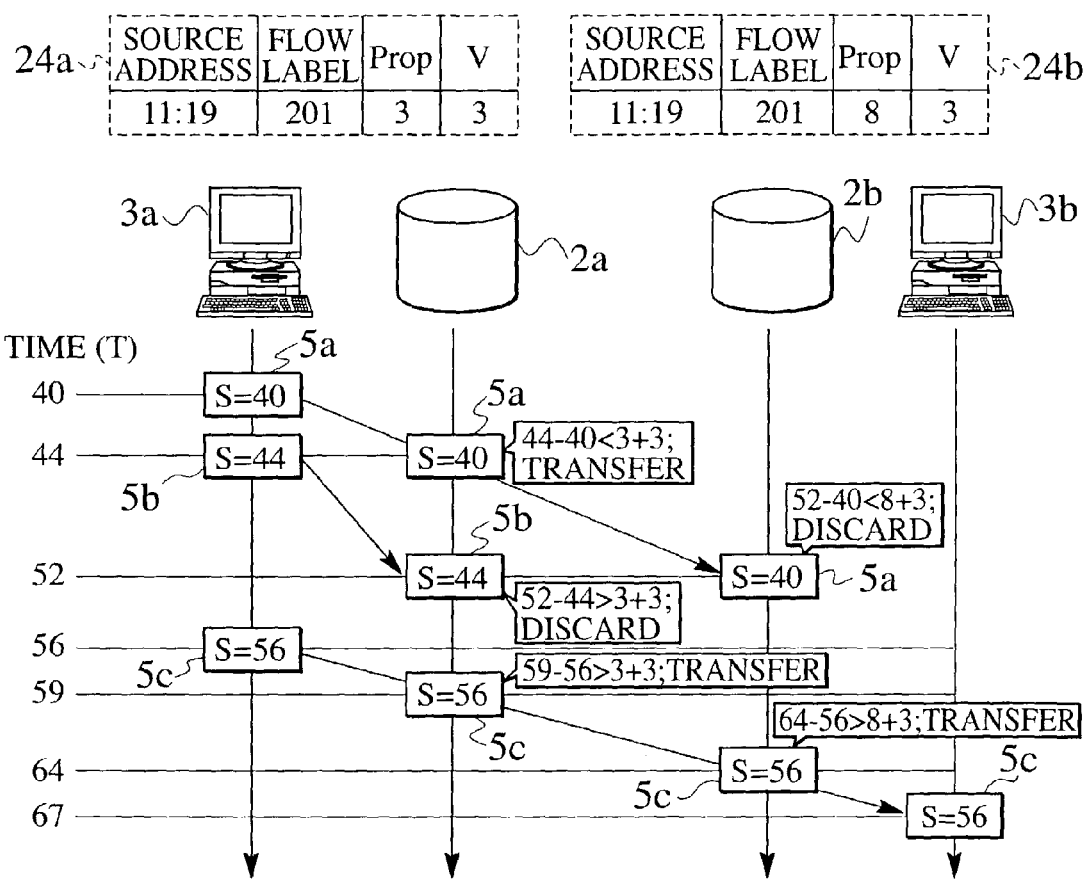
FIG. 8 is a diagram showing operation of a router, a transmission terminal, and a reception terminal when transferring a data packet according to the embodiment of the present invention.

Next, operation of the routers 2a and 2b, the transmission terminal 3a, and the reception terminal 3b when transferring data packets 5a through 5c between the transmission terminal 3a and reception terminal 3b is described. It should be noted that the data packets 5a through 5c also include the header 51 and payload 52, similarly to the data packet 5. As shown in FIG. 8, the processing unit 34 of the transmission terminal 3a records in the header 51 of the data packet 5a information such as a source departure time S=40 based on the current time obtained from the clock 33, a flow label L=201, and a source address "11:19", and records the data in the payload 52. The transmitter/receiver 35 of the transmission terminal 3a then transmits the data packet 5a to the router 2a.

Next, the divider 21 of the router 2a receives the data packet 5a and divides it into the header 51 and the payload 52. The divider 21 provides the header 51 to the header processing unit 22. Furthermore, the divider 21 inputs the header 51 to the AND circuits 27a and 28a, and the payload 52 to the AND circuits 27b and 28b. The header processing unit 22 of the router 2a obtains the source departure time S=40 from the obtained header 51 and provides it to the time judgment unit 26. The time judgment unit 26 of the router 2a obtains a current time T=44 from the clock 23. The time judgment unit 26 of the router 2a then finds the difference between the current time T=44 and the source departure time S=40 so as to obtain the delay time T−S=4 of the data packet 5a from the transmission terminal 3a to the router 2.

Next, the header processing unit 22 of the router 2a obtains the flow label from the header 51. The header processing unit 22 searches the flow label table 24 using that flow label. The header processing unit 22 of the router 2a obtains a propagation delay time Prop=3 that occurs in the router 2a and an delay variance V=3, which are shown in the partial flow label table 24a, and inputs them to the time judgment unit 26. Furthermore, the header processing unit 22 of the router 2a searches the flow label table 24 using the flow label so as to obtain the address of the router 2b, which is the transfer destination of the data packet 5a. The header processing unit 22 of the router 2a instructs the routing unit 25 of the router 2a to transfer the data packet 5a to the obtained address of the router 2b.

The time judgment unit 26 of the router 2a adds together the propagation delay time Prop=3 that occurs in the router 2a and the delay variance V=3, which are obtained from the header processing unit 22, and obtains the acceptable delay time Prop+V=6 for the router 2a. The time judgment unit 26 of the router 2a compares the delay time T−S=4 of the data packet 5a that occurs in the router 2a with the acceptable delay time Prop+V=6 for the router 2a, and judges whether the delay time that occurs in the router 2a is within the range of the acceptable delay time for the router 2a. Since the delay time is less than the acceptable delay time, the time judgment unit 26 of the router 2a inputs "0" to the AND circuits 27a, 27b, 28a, and 28b. The AND circuits 27a and 27b of the router 2a activate the restructuring unit 29 if receiving the input "0" from the time judgment unit 26. Furthermore, the AND circuit 27a inputs the header 51 to the restructuring unit 29 of the router 2a. The AND circuit 27b inputs the payload 52 to the restructuring unit 29 of the router 2a. The restructuring unit 29 of the router 2a creates the data packet 5a by restructuring the inputted header 51 and payload 52, and inputs it to the routing unit 25. The routing unit 25 of the router 2a transfers the data packet 5a, which is obtained from the restructuring unit 29, to the router 2b as instructed by the header processing unit 22.

In the same way, the router 2b receives the data packet 5a. The divider 21 of the router 2b provides the divided header 51 to the header processing unit 22. Furthermore, the divider 21 inputs the header 51 to the AND circuits 27a and 28a, and the payload 52 to the AND circuits 27b and 28b. The header processing unit 22 of the router 2b obtains the source departure time S=40 from the header 51, and inputs it to the time judgment unit 26. The time judgment unit 26 of the router 2b obtains a current time T=52 from the clock 23. The time judgment unit 26 of the router 2b then finds the difference between the current time T=52 and the source departure time S=40 so as to obtain the delay time T−S=12 of the data packet 5a from the transmission terminal 3a to the router 2b.

Next, the header processing unit 22 of the router 2b obtains the flow label from the header 51 and searches the flow label table 24. The header processing unit 22 of the router 2b obtains a propagation delay time Prop=8 that occurs in the router 2b and the delay variance V=3, which are shown in the partial flow label table 24b, and inputs them to the time judgment unit 26. Furthermore, the header processing unit 22 of the router 2b searches the flow label table 24 using the flow label and obtains the address of the reception terminal 3b, which is the transfer destination of the data packet 5a. The header processing unit 22 of the router 2b instructs the routing unit 25 of the router 2b to transfer the data packet 5a to the obtained address of the reception terminal 3b.

The time judgment unit 26 of the router 2b adds together the propagation delay time Prop=8 that occurs in the router 2b and the delay variance V=3, which are obtained from the header processing unit 22, and obtains the acceptable delay time Prop+V=11 for the router 2b. The time judgment unit 26 of the router 2b compares the delay time T−S=12 of the data packet 5a that occurs in the router 2b with the acceptable delay time Prop+V=11 for the router 2b.

The time judgment unit 26 of the router 2b judges that transfer of the data packet 5a to the reception terminal 3b is useless since the delay time that occurs in the router 2b is equal to or greater than the acceptable delay time for the router 2b, and therefore inputs "1" to the AND circuits 27a, 27b, 28a, and 28b of the router 2b. If the AND circuits 28a and 28b of the router 2b receive the input "1" from the time judgment unit 26, the discarding unit 30 of the router 2b is activated. Furthermore, the AND circuit 28a inputs the header 51 to the discarding unit 30, and the AND circuit 28b inputs the payload 52 to the discarding unit 30. The discarding unit 30 of the router 2b discards the input header 51 and payload 52.

The same processing is executed for the data packet 5b that leaves the transmission terminal 3a at a time T=44. The transmission terminal 3a records the necessary information such as the source departure time S=44, and transmits to the router 2a the data packet 5b with data recorded in the payload 52. The router 2a receives the data packet 5b. The time judgment unit 26 of the router 2a obtains the source departure time S=44 from the header processing unit 22 and a current time T=52 from the clock 23. The time judgment unit 26 of the router 2a then finds the difference between the current time T=52 and the transmission terminal departure time S=44 so as to obtain T−S=8 as the delay time of the data packet 5b from the transmission terminal 3a to the router 2a.

Next, the header processing unit 22 of the router 2a searches the flow label table 24 using the flow label, obtains a propagation delay time Prop=3 that occurs in the router 2a and a delay variance V=3, and provides them to the time judgment unit 26. The time judgment unit 26 of the router 2a adds together the propagation delay time Prop=3 that occurs in the router 2a and the delay variance V=3, and obtains the acceptable delay time Prop+V=6 for the router 2a. The time judgment unit 26 of the router 2a compares the delay time T−S=8 of the data packet 5b that occurs in the router 2a with the acceptable delay time Prop+V=6 for the router 2a. Since the delay time that occurs in the router 2a is greater than the acceptable delay time for the router 2a, the time judgment unit 26 inputs "1" to the AND circuits 27a, 27b, 28a, and 28b. The AND circuit 28a of the router 2a inputs the header 51 to the discarding unit 30. The AND circuit 28b of the router 2a inputs the payload 52 to the discarding unit 30. The discarding unit 30 of the router 2a then discards the inputted header 51 and payload 52.

The same processing is executed for the data packet 5c that leaves the transmission terminal 3a at a time T=56. The transmission terminal 3a records the necessary information such as the source departure time S=56, and transmits to the router 2a the data packet 5c with data recorded in the payload 52. The router 2a receives the data packet 5c. The time judgment unit 26 of the router 2a obtains the source departure time S=56 from the header processing unit 22 and a current time of T=59 from the clock 23. The time judgment unit 26 of the router 2a then finds the difference between the current time T=59 and the transmission terminal departure time S=56 so as to obtain the delay time T−S=3 of the data packet 5c from the transmission terminal 3a to the router 2a.

Next, the header processing unit 22 of the router 2a searches the flow label table 24 using the flow label, obtains the propagation delay time Prop=3 that occurs in the router 2a and a delay variance V=3, and provides them to the time judgment unit 26. The time judgment unit 26 of the router 2a adds together the propagation delay time Prop=3 that occurs in the router 2a and the delay variance V=3, and obtains the acceptable delay time Prop+V=6 for the router 2a. The time judgment unit 26 of the router 2a compares the delay time T−S=3 of the data packet 5c that occurs in the router 2a with the acceptable delay time Prop+V=6 for the router 2a. Since the delay time that occurs in the router 2a is less than the acceptable delay time for the router 2a, the time judgment unit 26 of the router 2a inputs "0" to the AND circuits 27a, 27b, 28a, and 28b. Furthermore, the AND circuit 27a of the router 2a inputs the header 51 to the restructuring unit 29. The AND circuit 27b of the router 2a inputs the payload 52 to the restructuring unit 29. The restructuring unit 29 of the router 2a creates the data packet 5c by restructuring the inputted header 51 and payload 52. The routing unit 25 of the router 2a then transfers the data packet 5c to the router 2b.

Next, the router 2b receives the data packet 5c. The time judgment unit 26 of the router 2b obtains the source departure time S=56 from the header processing unit 22 and a current time T=64 from the clock 23. The time judgment unit 26 of the router 2b then finds the difference between the current time T=64 and the source departure time S=56 so as to obtain the delay time T−S=8 of the data packet 5c from the transmission terminal 3a to the router 2b. Next, the header processing unit 22 of the router 2b searches the flow label table 24 using the flow label, obtains a propagation delay time Prop=8 that occurs in the router 2b and the delay variance V=3, and provides them to the time judgment unit 26. The time judgment unit 26 of the router 2b adds together the propagation delay time Prop=8 that occurs in the router 2b and the delay variance V=3, and obtains the acceptable delay time Prop+V=11 for the router 2b.

The time judgment unit 26 of the router 2b compares the delay time T−S=8 of the data packet 5c that occurs in the router 2b with the acceptable delay time Prop+V=11 for the router 2b. Since the delay time that occurs in the router 2b is less than the acceptable delay time for the router 2b, the time judgment unit 26 of the router 2b inputs "0" to the AND circuits 27a, 27b, 28a, and 28b. The AND circuit 27a of the router 2b then inputs the header 51 to the restructuring unit 29, and the AND circuit 27b of the router 2b inputs the payload 52 to the restructuring unit 29. The restructuring unit 29 of the router 2b creates the data packet 5c by restructuring the inputted header 51 and payload 52. The routing unit 25 of the router 2b transfers the data packet 5c to the reception terminal 3b. The transmitter/receiver 35 of the reception terminal 3d receives the data packet 5c from the router 2b. The processing unit 34 of the reception terminal 3b then recreates that data packet 5c as an application. In this manner, the data packet 5c is transferred to the reception terminal 3b since it reached each of the routers 2a and 2b within the acceptable delay time thereof.

Routing Method

Next, a routing method implemented utilizing the communication system 1 will be described.

(Route Setup)

Figure 9:
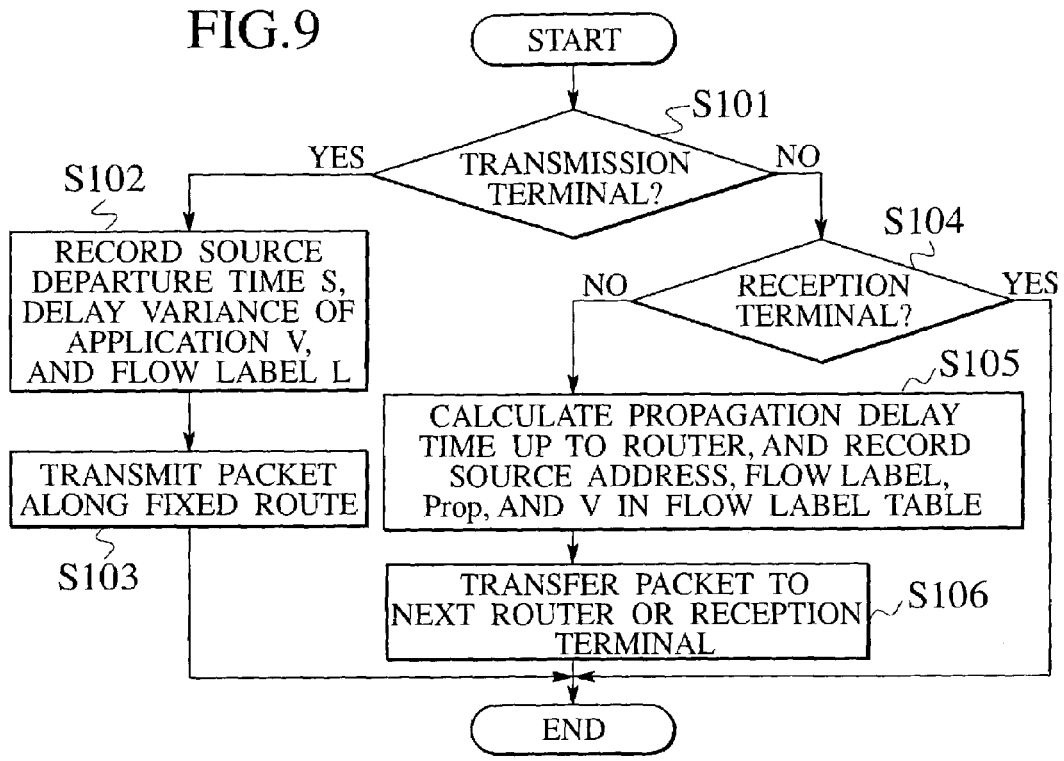
FIG. 9 is a flowchart showing a procedure of a routing method when setting up a route according to the embodiment of the present invention.

To begin with, a routing method for when setting up a route to transfer the data packet 5 between the transmission terminal 3a and reception terminal 3b is described. As shown in FIG. 9, in the case where it is the transmission terminal 3a in step S101, information such as the source departure time S based on the current time obtained from the clock 33, the delay variance V, the flow label L, and the transmission source address are recorded in each field of the IPv6 header 41 and option header 42 in the route setup packet 4 (S102). The transmission terminal 3a then transmits the route setup packet 4 to the router 2a along a fixed route (S103).

On the other hand, in the case where it is neither the transmission terminal 3a in step S101 nor the reception terminal 3b in step S104, it is the router 2a or 2b along the route. The router 2a or 2b receives the route setup packet 4, obtains the source departure time from the route setup packet 4, and obtains the current time from the clock 23. The router 2a or 2b then finds the difference between the current time and the source departure time so as to calculate the propagation delay time from the transmission terminal 3a to that router 2a or 2b. The router 2a or 2b then obtains the source address, flow label, and delay variance from the route setup packet 4, recording them in the flow label table 24. Furthermore, the router 2a or 2b also records in the flow label table 24 the calculated propagation delay time that occurs in the router 2a or 2b (S105). Next, in case of the router 2a, the route setup packet 4 is transferred to the next router 2b along the route. Furthermore, in case of the router 2b, the route setup packet 4 is transferred to the reception terminal 3b (S106).

It should be noted that in the case where it is not the transmission terminal 3a in step S101 but is the reception terminal 3b in step S104, there is no operation particularly performed when setting up the route.

(Data Packet Transfer)

Figure 10:
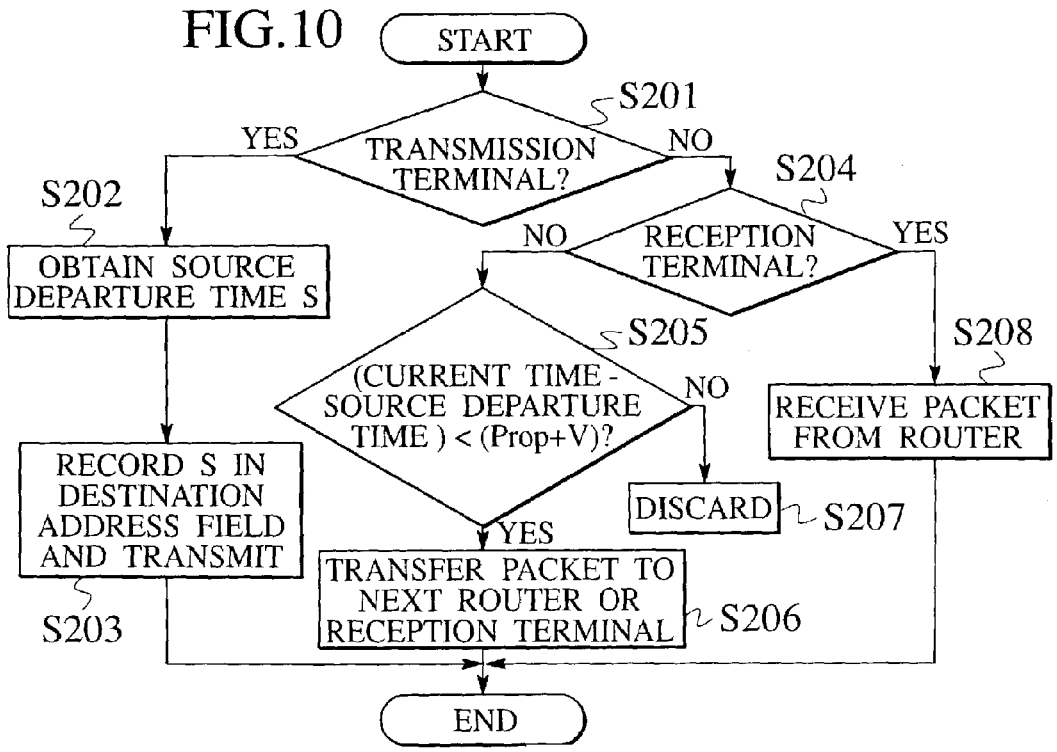
FIG. 10 is a flowchart showing a procedure of a routing method when transferring a data packet according to the embodiment of the present invention.

Next, a routing method for when transferring the data packet 5 between the transmission terminal 3a and the reception terminal 3b will be described. As shown in FIG. 10, in the case where it is the transmission terminal 3a in step S201, the transmission terminal 3a obtains the current time from the clock 33 as the source departure time when transmitting the data packet 5 (S202). The transmission terminal 3a uses the destination address field that normally records the destination address as the source departure time field 51h in the header 51 of the data packet 5 so as to record the source departure time. The transmission terminal 3a then transmits the data packet 5 to the router 2a that is downstream along the route (S203).

On the other hand, in the case where it is neither the transmission terminal 3a in step S201 nor the reception terminal 3b in step S204, it is the router 2a or 2b along the route. The router 2a or 2b receives the data packet 5. The router 2a or 2b obtains the source departure time from the data packet 5. The router 2a or 2b obtains the current time from the clock 23. The router 2a or 2b then calculates the delay time of the data packet 5 from the transmission terminal 3a to the router 2a or 2b. Furthermore, the router 2a or 2b obtains the propagation delay time Prop and delay variance V from the flow label table 24. The router 2a or 2b adds these two together so as to calculate the acceptable delay time for the router 2a or 2b. The router 2a or 2b then compares the delay time of the data packet 5 that occurs in the router 2a or 2b with the acceptable delay time for the router 2a or 2b (S205).

In step S205, in the case where the delay time that occurs in the router 2a or 2b is less than the acceptable delay time for the router 2a or 2b, and the data packet 5 arrives at the router 2a or 2b before the acceptable delay time for the router 2a or 2b, the router 2a transfers the data packet 5 to the next router 2b. Furthermore, the router 2b transfers the data packet 5 to the reception terminal 3b (S206).

On the other hand, in step S205, in the case where the delay time that occurs in the router 2a or 2b is equal to or greater than the acceptable delay time for the router 2a or 2b, and the data packet 5 arrives at the router 2a or 2b at the same time or after the acceptable delay time for the router 2a or 2b, the router 2a or 2b discards the data packet 5 (S207).

It should be noted that in the case where it is not the transmission terminal 3a in step S201 but is the reception terminal 3b in step S104, the reception terminal 3b receives the data packet 5 from the router 2b. The reception terminal 3b then performs packet processing such as recreating the received data packet 5 as an application (S208).

(Router Processing)

Next, processing carried out by the router 2 in the routing method when transferring the data packet 5 is described in further detail. As shown in FIG. 11, the divider 21 receives the data packet 5 that is transmitted from the transmission terminal 3a or a router 2 that is further upstream along the route. The divider 21 then divides the data packet 5 into the header 51 and the payload 52 (S301). The divider 21 provides the header 51 to the header processing unit 22, inputs the header 51 to the AND circuits 27a and 28a, and inputs the payload 52 to the AND circuits 27b and 28b.

The header processing unit 22 obtains the source departure time from the obtained header 51, and provides it to the time judgment unit 26. The time judgment unit 26 obtains the current time from the clock 23 and the source departure time from the header processing unit 22. The time judgment unit 26 then finds the difference between the current time and the source departure time so as to calculate the delay time of the data packet 5 from the transmission terminal 3a to the router 2 (S302).

Next, the header processing unit 22 obtains the flow label from the header 51. The header processing unit 22 searches the flow label table 24 using that flow label and obtains the propagation delay time that occurs in the router 2 and the acceptable delay time variance. The header processing unit 22 provides the obtained propagation delay time and delay variance to the time judgment unit 26 (S303). The header processing unit 22 searches the flow label table 24 using the flow label and obtains the address of the next router 2 or the reception terminal 3b, which is the transfer destination of the data packet 5. The header processing unit 22 then instructs the routing unit 25 to transfer the data packet 5 to the address of the next router 2 or reception terminal 3b.

The time judgment unit 26 obtains the propagation delay time that occurs in the router 2 and the delay variance from the header processing unit 22, and adds these two together to calculate the acceptable delay time for the router 2 (S304). The time judgment unit 26 compares the delay time of the data packet 5 that occurs in the router 2 with the acceptable delay time for the router 2 to judge whether the delay time is within the acceptable delay time range (S305).

In step S305, in the case where the delay time that occurs in the router 2 is less than the acceptable delay time for router 2, the time judgment unit 26 inputs "0" to the AND circuits 27a, 27b, 28a, and 28b (S306). If the AND circuits 27a and 27b receives the input "0" from the time judgment unit 26 and that "0" is replaced with "1" and input, the restructuring unit 29 is activated. Furthermore, the AND circuit 27a inputs the header 51 to the restructuring unit 29, and the AND circuit 27b inputs the payload 52 to the restructuring unit 29 (S307). The restructuring unit 29 creates the data packet 5 by restructuring the input header 51 and payload 52, and inputs it to the routing unit 25 (S308). The routing unit 25 transfers the data packet 5, which is obtained from the restructuring unit 29, to the next router 2 or reception terminal 3b as instructed by the header processing unit 22 (S309).

On the other hand, in step S305, in the case where the delay time that occurs in the router 2 is equal to or greater than the acceptable delay time for the router 2, the time judgment unit 26 inputs "1" to the AND circuits 27a, 27b, 28a, and 28b (S310). If the AND circuits 28a and 28b receive the input "1" from the time judgment unit 26, the discarding unit 30 is activated. Furthermore, the AND circuit 28a inputs the header 51 to the discarding unit 30, and the AND circuit 28b inputs the payload 52 to the discarding unit 30 (S311). The discarding unit 30 discards the inputted header 51 and payload 52 (S312).

According to this type of router 2, terminal apparatus 3, communication system 1, and routing method, the time judgment unit 26 may obtain the current time from the clock 23, which is synchronous to the transmission terminal 3a, and the source departure time from the data packet 5. The time judgment unit 26 may then easily grasp the delay time by calculating from the current time and source departure time the delay time that occurs in the router 2 for the data packet 5 that is transmitted from the transmission terminal 3a. Furthermore, via the header processing unit 22, the time judgment unit 26 may obtain the delay variance and the propagation delay time that occurs in the router 2 so as to find the acceptable delay time for the router 2.

The time judgment unit 26 then compares the delay time of the data packet 5 that occurs in the router 2 with the acceptable delay time for the router 2, and inputs the comparison result to the AND circuits 27a, 27b, 28a, and 28b. According to that comparison result, in the case where the delay time that occurs in the router 2 is less than the acceptable delay time for the router 2, the header 51 and payload 52 are inputted to the restructuring unit 29. Furthermore, in the case where the delay time that occurs in the router 2 is equal to or greater than the acceptable delay time for the router 2, the header 51 and payload 52 are input to the discarding unit 30. The restructuring unit 29 then restructures the data packet 5 and inputs it to the routing unit 25. The routing unit 25 transfers the data packet 5. The discarding unit 30 discards the header 51 and payload 52.

Accordingly, the router 2, based on the result of comparing the delay time of the data packet 5 that occurs in the router 2 with the acceptable delay time for the router 2, can discard a data packet 5 that has become unnecessary since it arrived at the router 2 later than the acceptable delay time and cannot be eventually recreated as a normal application at the reception terminal 3b. The router 2 can then appropriately transfer only a data packet 5 that is necessary for the reception terminal 3b. Accordingly, the router 2 can eliminate the transfer processing of an unnecessary data packet 5 with a large delay and that is eventually discarded by the reception terminal 3b even if it is transferred to the reception terminal 3b.

As a result, network resources can be effectively utilized. Furthermore, it is not necessary for the reception terminal 3b to perform processing of receiving and discarding a data packet 5 that is unnecessary for the reception terminal 3b. Accordingly, computing resources in the reception terminal 3b can also be effectively utilized. Moreover, by having the router 2 along the route carry out processing of discarding the data packet 5, which the reception terminal 3b performed thus far, the load of packet processing can be dispersed between the router 2 and reception terminal 3b. Furthermore, since the router 2 can discard a data packet 5 that does not satisfy the constraint on communication with strict time limits of the acceptable delay time, communication with strict time limits may be supported.

Furthermore, each router 2 does not compare the total acceptable delay time of the data packet 5 from the transmission terminal 3a to the reception terminal 3b with the delay time of the data packet 5 that occurs in each router 2; however, calculates the acceptable delay time that for each router 2 and compares the acceptable delay time of the data packet 5 for each router 2 with the delay time of the data packet 5 that occurs in each router 2. Therefore, a data packet 5 with which the total acceptable delay time from the transmission terminal 3a to the reception terminal 3b is not yet reached, but a delay has already occurred, and the total acceptable delay cannot be satisfied after all supposing it has been transferred thereafter, can be discarded along the route at an early stage that is somewhere further upstream in the route by the router 2. Accordingly, the router 2 is able to further reduce transfer processing of an unnecessary data packet 5, and more effectively utilize network resources.

It should be noted that the present invention is not limited to the above embodiment, and various modifications are possible. In the above embodiment, the header processing unit 22 records in the flow label table 24 the propagation delay time and delay variance as the acceptable delay time information. However, the header processing unit 22 may add together the propagation delay time and delay variance to find the acceptable delay time for the router 2,and records the acceptable delay time for the router 2 itself in the flow label table 24 as the acceptable delay time information. Accordingly, the processing load of the router 2 when transferring the data packet 5 can be reduced, allowing for a more speedy routing control for the data packet 5.

Furthermore, the time judgment unit 26 activates the discarding unit 30 by inputting "1" to the AND circuits 27a, 27b, 28a, and 28b in the case where the delay time is equal to the acceptable delay time, as is in the case where the delay is equal to or greater than the acceptable delay where "1" is inputted as the comparison result. Accordingly, in the router 2 located mid-route, a data packet 5 that has a delay time that has reached the acceptable delay time and has a high probability of becoming unnecessary in the reception terminal 3b even should it be transferred, can be discarded. Therefore, the router 2 can reduce useless transfer processing. However, the time judgment unit 26 may activate the restructuring unit 29 by inputting "0" in the case of the delay time equaling the acceptable delay time.

Furthermore, even in the case where the delay time is less than the acceptable delay time, the router 2 may discard a data packet 5 that has little difference between the delay time and the acceptable delay time and has an extremely high possibility of exceeding the acceptable delay time, becoming unnecessary when arriving at the reception terminal 3b even should be transferred. Accordingly, the router 2 can further reduce useless transfer processing. For example, in the case where the time judgment unit 26 finds the difference between the delay time and acceptable delay time, and that difference is greater than a predetermined threshold value, the time judgment unit 26 inputs "0" to the AND circuits 27a, 27b, 28a, and 28b to activate the restructuring unit 29. On the other hand, in the case where the difference is equal to or less than the predetermined threshold value, the time judgment unit 26 inputs "1" to the AND circuits 27a, 27b, 28a, and 28b to activate the discarding unit 30.

What is claimed is:

1. A router, comprising:
   a clock configured to be synchronous to a transmission terminal that transmits a route setup packet and a data packet and to provide a current time;
   a propagation delay time calculating unit configured to calculate a propagation delay time;
   an acceptable delay time calculating unit configured to calculate an acceptable delay time by use of acceptable delay time information and the propagation delay time;
   a comparator configured to compare a delay time of the data packet with the acceptable delay time calculated by the acceptable delay time calculating unit; and
   a packet processing unit configured to either transfer or discard the data packet based on the comparison result of the comparator,
   wherein
   the route setup packet is used when setting up a route to transfer the data packet and includes a delay variance and a source departure time of the route setup packet as the acceptable delay time information,
   the source departure time of the route setup packet indicates a time that the transmission terminal transmits the route setup packet,
   the propagation delay time calculating unit calculates the propagation delay time by use of the source departure time of the route setup packet and the current time obtained from the clock, and
   the acceptable delay time calculating unit calculates the acceptable delay time of the data packet by adding together the delay variance and the propagation delay time.

2. The router according to claim 1, wherein
   the packet processing unit comprises:
   a discarding unit configured to discard the data packet if the delay time is greater than the acceptable delay time based on the comparison result of the comparator; and
   a transfer unit configured to transfer the data packet if the discarding unit does not discard the data packet.

3. The router according to claim 1, further comprising:
   a delay time calculating unit configured to calculate the delay time of the data packet;
   wherein the data packet includes a source departure time of the data packet,
   the source departure time of the data packet indicates a time that the transmission terminal transmits the data packet; and
   the delay time calculating unit calculates the delay time of the data packet by use of the source departure time of the data packet and the current time obtained from the clock.

4. The router according to claim 1, further comprising:
a memory unit configured to store the acceptable delay time information,
wherein the delay variance, the source departure time of the route setup packet, and the propagation delay time calculated by the propagation delay time calculating unit are recorded in the memory unit as the acceptable delay time information, and
the acceptable delay time calculating unit obtains the acceptable delay time information from the memory unit and calculates the acceptable delay time of the data packet.

5. A router comprising:
a clock configured to be synchronous to a transmission terminal that transmits a data packet and to provide a current time;
a delay time calculating unit configured to calculate a delay time of the data packet;
a comparator configured to compare the delay time of the data packet with an acceptable delay time of the data packet based on the current time obtained from the clock; and
a packet processing unit configured to either transfer or discard the data packet based on the comparison result of the comparator,
wherein
the header of the data packet includes a flow label field in which a flow label is recorded and a destination address field in which a source departure time of the data packet is recorded,
the source departure time of the data packet indicates a time that the transmission terminal transmits the data packet, and
the delay time calculating unit obtains the source departure time of the data packet from the destination address field and calculates the delay time of the data packet by use of the source departure time of the data packet and the current time obtained from the clock.

6. A terminal apparatus, comprising:
a transmitter configured to transmit a data packet and a route setup packet;
a clock configured to be synchronous to a plurality of routers, which transfer the data packet and the route setup packet transmitted by the transmitter, and to provide a current time; and
a control information recording unit configured to record acceptable delay time information related to an acceptable delay time of the data packet in a route setup packet, and to record a source departure time of the data packet in the data packet itself based on the current time obtained from the clock, wherein:
the route setup packet is used when setting up a route to transfer the data packet,
the source departure time of the data packet indicates a time that the transmitter transmits the data packet,
the control information recording unit records a source departure time of the route setup packet and a delay variance of the data packet as the acceptable delay time information in the route setup packet, and
the source departure time of the route setup packet indicates a time that the transmitter transmits the route setup packet.

7. The terminal apparatus according to claim 6, wherein
the delay variance of the data packet is a predetermined positive value, and
the acceptable delay time of the data packet is calculated by adding the delay variance and the time period from the source departure time of the route setup packet to arrival time of the route setup packet at each routers.

8. A terminal apparatus, comprising:
a transmitter configured to transmit a data packet;
a clock configured to be synchronous to a plurality of routers, which transfer the data packet transmitted by the transmitter, and to provide a current time; and
a control information recording unit configured to record a source departure time of the data packet in the data packet itself based on the current time obtained from the clock, wherein:
the source departure time of the data packet indicates a time that the transmitter transmits the data packet,
the header of the data packet includes a flow label field in which a flow label is recorded, and a destination address field, and
the control information recording unit records the source departure time of the data packet in the destination address field.

9. A communication system, comprising:
a transmission terminal configured to transmit a data packet and a route setup packet; and
a plurality of routers configured to transfer the data packet and the route setup packet, wherein
the transmission terminal comprises:
a first clock configured to be synchronous to a plurality of routers and to provide a current time; and
a control information recording unit configured to record acceptable delay time information related to an acceptable delay time of the data packet in the route setup packet based on the current time obtained from the first clock, and
each of the plurality of the routers comprises:
a second clock configured to be synchronous to a transmission terminal and to provide a current time;
a propagation delay time calculating unit configured to calculate a propagation delay time;
an acceptable delay time calculating unit configured to calculate an acceptable delay time by use of acceptable delay time information included in the route setup packet and the propagation delay time;
a comparator configured to compare a delay time of the data packet with the acceptable delay time calculated by the acceptable delay time calculating unit based on the current time obtained from the second clock; and
a packet processing unit configured to either transfer or discard the data packet based on the comparison result of the comparator, wherein:
the route setup packet is used when setting up a route to transfer the data packet and includes a delay variance and a source departure time of the route setup packet as the acceptable delay time information
the source departure time of the route setup packet indicates a time that the transmission terminal transmits the route setup packet,
the propagation delay time calculating unit calculates the propagation delay time by use of the source departure time of the route setup packet and the current time obtained from the second clock, and
the acceptable delay time calculating unit calculates the acceptable delay time of the data packet by adding together the delay variance and the propagation delay time.

10. The communication system according to claim 9, wherein the control information recording unit is further configured to record a source departure time of the data packet in the data packet itself based on the current time obtained from the first clock, and each of the routers further comprises:

a delay time calculating unit configured to calculate the delay time of the data packet, wherein:

the source departure time of the data packet indicates a time that the transmission terminal transmits the data packet, and the delay time calculating unit calculates the delay time of the data packet by use of the source departure time of the data packet and the current time obtained from the second clock.

11. A routing method, comprising the steps of:

obtaining, by a transmission terminal, a current time from a first clock synchronous to a plurality of routers and providing a current time;

recording, by the transmission terminal, acceptable delay time information related to an acceptable delay time of a data packet in a route setup packet based on the current time obtained from the first clock;

transmitting, by the transmission terminal, the route setup packet;

obtaining, by each of the plurality of the routers, a current time from a second clock that is synchronous to the transmission terminal and providing a current time;

calculating, by each of the plurality of routers, a propagation delay time;

calculating, by each of the plurality of the routers, the acceptable delay time by use of acceptable delay time included in the route setup packet and the propagation delay time;

transmitting, by the transmission terminal, the data packet;

comparing, by each of the plurality of the routers, a delay time of the data packet with the acceptable delay time based on the current time obtained from the second clock; and either transferring or discarding, by each of the plurality of the routers, the data packet based on the comparison result, wherein:

the route setup packet is used when setting up a route to transfer the data packet and includes a delay variance and a source departure time of the route setup packet as the acceptable delay time information, the source departure time of the route setup packet indicates a time that the transmission terminal transmits the route setup packet, in the step of calculating the propagation delay time, the propagation delay time is calculated by use of the source departure time of the route setup packet and the current time obtained from the second clock, and in the step of calculating the acceptable delay time, the acceptable delay time of the data packet is calculated by adding together the delay variance and the propagation delay time.

12. The routing method according to claim 11, further comprising the steps of:

recording, by the transmission terminal, a source departure time fo the data packet in the data packet itself based on the current time obtained from the first clock;

obtaining, by each of the plurality of the routers, the source departure time of the data packet from the data packet; and calculating, by each of the plurality of the routers, the delay time of the data packet based on the source departure time of the data packet and current time obtained from the second clock, wherein the source departure time of the data packet indicates a time that the transmission terminal transmits the data packet.

* * * * *